US012647195B2

(12) United States Patent
Mase et al.

(10) Patent No.: US 12,647,195 B2
(45) Date of Patent: Jun. 2, 2026

(54) BASE STATION SYSTEM, BASE STATION CONTROL DEVICE, BASE STATION CONTROL METHOD, AND BASE STATION CONTROL PROGRAM

(71) Applicant: NTT, Inc., Tokyo (JP)

(72) Inventors: Kazunari Mase, Musashino (JP);
Katsuya Minami, Musashino (JP);
Yasutaka Kimura, Musashino (JP);
Yasutaka Okazaki, Musashino (JP)

(73) Assignee: NTT, Inc., Tokyo (JP)

( * ) Notice: Subject to any disclaimer, the term of this patent is extended or adjusted under 35 U.S.C. 154(b) by 276 days.

(21) Appl. No.: 18/564,653

(22) PCT Filed: Jun. 4, 2021

(86) PCT No.: PCT/JP2021/021446
§ 371 (c)(1),
(2) Date: Nov. 28, 2023

(87) PCT Pub. No.: WO2022/254721
PCT Pub. Date: Dec. 8, 2022

(65) Prior Publication Data
US 2024/0187121 A1     Jun. 6, 2024

(51) Int. Cl.
*H04J 14/02* (2006.01)
*H04B 10/2581* (2013.01)
(52) U.S. Cl.
CPC ...... *H04J 14/0226* (2013.01); *H04B 10/2581* (2013.01); *H04J 14/0282* (2013.01)

(58) Field of Classification Search
None
See application file for complete search history.

(56) References Cited

U.S. PATENT DOCUMENTS

2017/0055163 A1* 2/2017 Fujinami ............... H04L 5/0037
2019/0319736 A1* 10/2019 Hanson ............. H04Q 11/0005

OTHER PUBLICATIONS

[No Author Listed], "Conclusion of a Capital & Business Partnership between NTT and JTOWER ~ Resolution of social issues through promotion of sharing models in the 5G age," Nippon Telegraph and Telephone Corporation, Jul. 2019, 6 pages (with English translation).

(Continued)

*Primary Examiner* — David W Lambert
(74) *Attorney, Agent, or Firm* — Fish & Richardson P.C.

(57) ABSTRACT

The present disclosure is a base station system S that connects each of base station functional units that provides each of radio schemes and each of antenna units in each of provision areas via an optical fiber section, the base station system including passive light functional units disposed between each of base station functional units and each of antenna unit and including each downlink signal output port to which each downlink signal wavelength is allocated and each uplink signal output port to which each uplink signal wavelength is allocated and an optical switch disposed between each of the antenna units and the passive light functional units, accommodates some of each of the radio schemes, and switches to which one of the provision areas the some of the radio schemes are provided.

7 Claims, 13 Drawing Sheets

(56)                    References Cited

OTHER PUBLICATIONS

[No Author Listed], "Technical Report on Optical Access in Fronthaul of Fifth Generation Mobile Communication Systems," TTC Technical Report, TR-1079, May 2019, 85 pages (with English translation).

Zeng et al., "5G Virtualized Radio Access Network Approach Based on NO Stack Framework," IEEE ICC 2017 Next Generation Networking and Internet Symposium, May 2017, 5 pages.

Zhang et al., "High speed WDM-PON technology for 5G fronthaul network, " 2018 Asia Communications and Photonics Conference (ACP), Oct. 2018, 3 pages.

* cited by examiner

Fig. 1

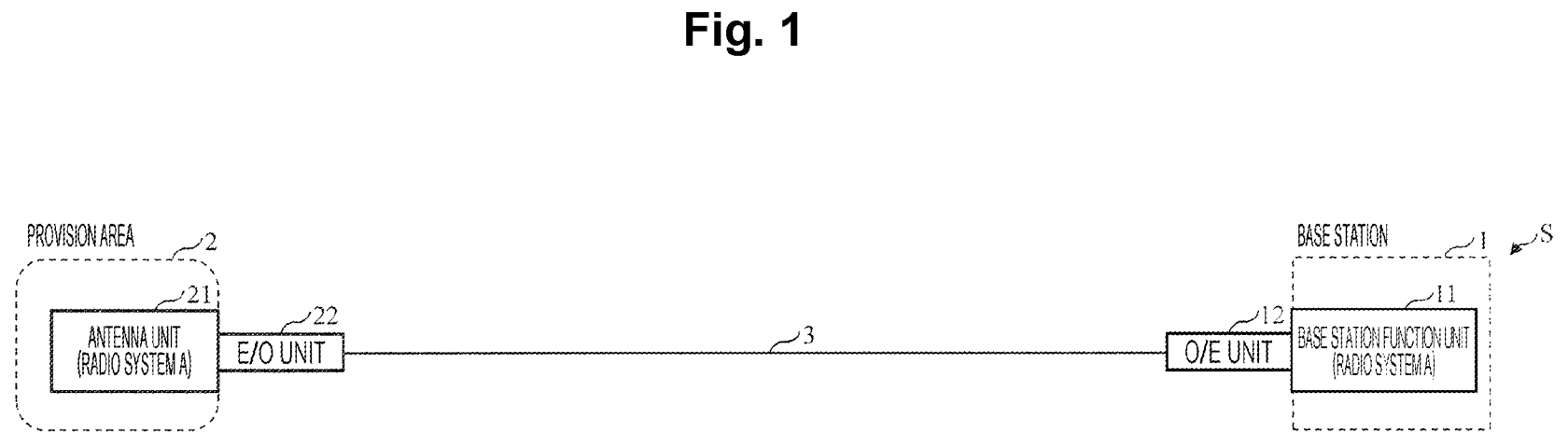

BASE STATION

1

11

BASE STATION FUNCTION UNIT (RADIO SYSTEM A)

12

O/E UNIT

S

3

22

E/O UNIT

PROVISION AREA

2

21

ANTENNA UNIT (RADIO SYSTEM A)

BASE STATION SYSTEM, BASE STATION CONTROL DEVICE, BASE STATION CONTROL METHOD, AND BASE STATION CONTROL PROGRAM

CROSS-REFERENCE TO RELATED APPLICATIONS

This application is a National Stage application under 35 U.S.C. § 371 of International Application No. PCT/JP2021/021446, having an International Filing Date of Jun. 4, 2021, the disclosure of which is considered part of the disclosure of this application, and is incorporated by reference in its entirety into this application.

TECHNICAL FIELD

The present disclosure relates to a base station system, a base station control device, a base station control method, and a base station control program for connecting a base station functional unit and an antenna unit via an optical fiber section.

BACKGROUND ART

Conventionally, a technique of connecting a base station functional unit and an antenna unit via an optical fiber section is generally known. The optical fiber section between the base station functional unit and the antenna unit is called mobile fronthaul (MFH).

FIG. 1 illustrates a configuration of a conventional general base station system. The base station system S includes a base station functional unit 11 and an O/E unit 12 on a base station 1 side, an antenna unit 21 and an E/O unit 22 on a provision area 2 side, and an optical fiber section 3 that connects the base station 1 side and the provision area 2 side.

In downlink signal communication, the base station functional unit 11 generates a wireless signal in the wired area, the O/E unit 12 converts the wireless signal in the wired area from electricity to light, the optical fiber section 3 propagates the wireless signal in the wired area, the E/O unit 22 converts the wireless signal in the wired area from light to electricity, and the antenna unit 21 converts the wireless signal in the wired area into a specific radio wave and transmits the specific radio wave into the provision area 2.

In uplink signal communication, the antenna unit 21 receives a specific radio wave from the inside of the provision area 2 and converts the specific radio wave into a wireless signal in the wired area, the E/O unit 22 converts the wireless signal in the wired area from electricity to light, the optical fiber section 3 propagates the wireless signal in the wired area, the O/E unit 12 converts the wireless signal in the wired area from light to electricity, and the base station functional unit 11 processes the wireless signal in the wired area.

In the downstream signal communication and the upstream signal communication, the base station functional unit 11 provides the radio scheme A, and the antenna unit 21 applies the radio scheme A. The radio scheme A illustrated in FIG. 1 and the following radio schemes B and C are different from each other in parameters specific to a radio signal such as a frequency and a modulation method.

CITATION LIST

Non Patent Literature

Non Patent Literature 1: Written by General Incorporated Association Telecommunications Technology Committee "Technical report on optical access in fronthaul of 5th generation mobile communication system", Technical Report TR-1079, May 30, 2019, p. 19.

Non Patent Literature 2: De Zhi Zhang, Du Zhe, Ming Jiang, and Jun Zhang, "High speed WDM-PON technology for 5G", IEEE 2018 Asia Communications and Photonics Conference (ACP).

Non Patent Literature 3: "Overview of business of JTOWER", [online], Jul. 4, 2019, Nippon Telegraph and Telephone Co., Ltd., and JTOWER Co., Ltd., [retrieved on May 20, 2021], the Internet <URL: https://www.ntt-.co.jp/news2019/1907/190704a.html>

Non Patent Literature 4: Jie Zeng, Xin Su, Jinjin Gong, Liping Rong, and Jing Wang, "5G virtualized radio access network approach based on NO Stack framework", IEEE 2017 International Conference on Communications (ICC).

SUMMARY OF INVENTION

Technical Problem

In the future, the provision area is expected to be subdivided according to the use of high frequencies, radio schemes are expected to be diversified according to various applications, and in the base station system, an increase in radio resources such as a base station functional unit, an antenna unit, and an optical fiber section is expected.

Figure 2:
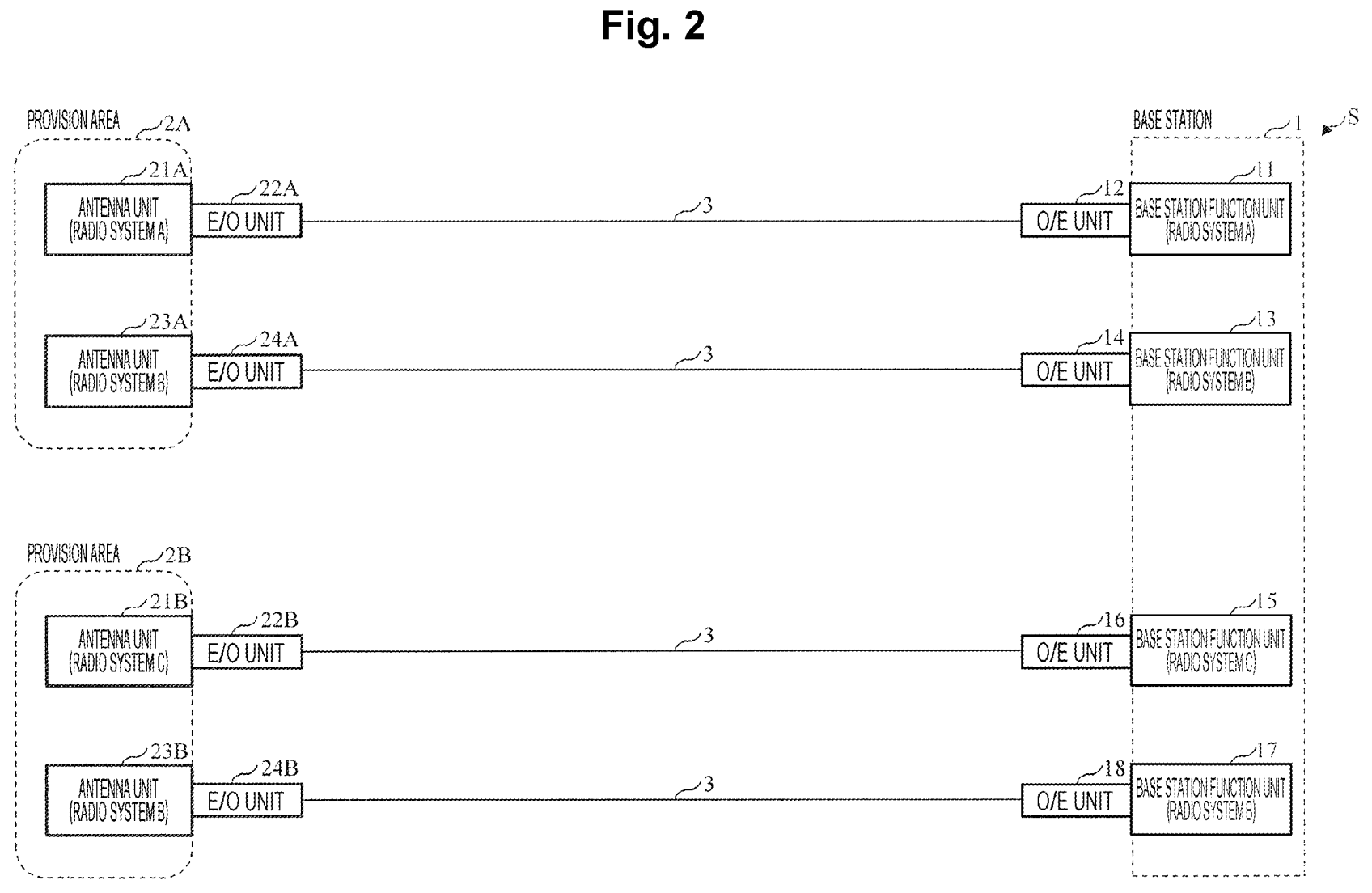

FIG. 2 illustrates a configuration of a base station system of Non Patent Literature 1. The base station system S includes base station functional units 11, 13, 15, and 17 and O/E units 12, 14, 16, and 18 on the base station 1 side, antenna units 21A and 23A and E/O units 22A and 24A on the provision area 2A side, antenna units 21B and 23B and E/O units 22B and 24B on the provision area 2B side, and an optical fiber section 3 that connects the base station 1 side and the side of the provision areas 2A and 2B.

The base station functional units 11, 13, 15, and 17 are connected to the antenna units 21A, 23A, 21B, and 23B, respectively, via the optical fiber section 3. The base station functional units 11, 13, 15, and 17 provide the radio schemes A, B, C, and B, respectively, and the antenna units 21A, 23A, 21B, and 23B apply the radio schemes A, B, C, and B, respectively. The provision area 2A is provided with the radio schemes A and B, and the provision area 2B is provided with the radio schemes B and C.

However, when radio resources such as a base station functional unit, an antenna unit, and an optical fiber section are arranged on the basis of peak demand, waste is caused in a case where some radio resources are not used, such as a case where a demand area changes according to a time zone. In FIG. 2, the radio scheme B is simultaneously provided to the provision areas 2A and 2B, but when demand is biased to a part of the provision areas 2A and 2B, the radio scheme B does not need to be simultaneously provided to the provision areas 2A and 2B.

The base station system of Non Patent Literature 2 saves an optical fiber section by using wavelength multiplexing as a radio resource saving method. The base station system of Non Patent Literature 3 saves an antenna unit by using sharing as a radio resource saving method. The base station system of Non Patent Literature 4 uses virtualization to save the base station functional units as a radio resource saving method, but cannot exert a saving effect in a case where some radio resources are not used.

A configuration of a base station system of the problem to be solved is illustrated in FIGS. 3 and 4. The base station system S includes base station functional units 11, 13, and 15 and O/E units 12, 14, and 16 on the base station 1 side, antenna units 21A and 23A and E/O units 22A and 24A on the provision area 2A side, antenna units 21B and 23B and E/O units 22B and 24B on the provision area 2B side, an optical fiber section 3 that connects the base station 1 side and the side of the provision areas 2A and 2B, and a new optical switch 4.

In FIG. 3, the base station functional units 11, 13, and 15 are respectively connected to the antenna units 21A, 23A, and 21B via the optical fiber section 3 and the optical switch functional unit 41 before switching. The base station functional units 11, 13, and 15 provide the radio schemes A, B, and C respectively, and the antenna units 21A, 23A, and 21B apply the radio schemes A, B, and C, respectively. The provision area 2A is provided with the radio schemes A and B, and the provision area 2B is provided with the radio scheme C.

In FIG. 4, the base station functional units 11, 13, and 15 are respectively connected to the antenna units 21A, 23B, and 21B via the optical fiber section 3 and the optical switch functional unit 41 after switching. The base station functional units 11, 13, and 15 provide the radio schemes A, B, and C, respectively, and the antenna units 21A, 23B, and 21B apply the radio schemes A, B, and C, respectively. The provision area 2A is provided with the radio scheme A, and the provision area 2B is provided with the radio schemes B and C.

In FIGS. 3 and 4, since the radio scheme B is provided to some of the provision areas 2A and 2B, when demand is biased to one of the provision areas 2A and 2B, the radio scheme B can be prevented from being simultaneously provided to the provision areas 2A and 2B. That is, in FIG. 2, there need to be two base station functional units 13 and 17 that provide radio scheme B, but in FIGS. 3 and 4, there need only be one base station functional unit 13 that provides the radio scheme B. However, in FIGS. 3 and 4, since the optical switch 4 is an active component that requires an external power supply, as the number of base station functional units 11, 13, and 15 and the number of antenna units 21A, 23A, 21B, and 23B increase, the failure rate increases due to an increase in the number of ports of the optical switch functional unit 41, and reliability decreases.

Therefore, in order to solve the above problem, an object of the present disclosure is to prevent an increase in the number of ports of an optical switch functional unit and to prevent waste of radio resources when subdivision of a provision area is expected, diversification of radio schemes is expected, and an increase in radio resources is expected.

Solution to Problem

In order to solve the above problem, a passive light functional unit is arranged between a plurality of base station functional units and a plurality of provision areas. The passive light functional unit demultiplexes and combines a plurality of downlink signal wavelengths and uplink signal wavelengths, and is a passive component that does not require an external power supply, and has a low failure rate and high reliability. An optical switch is disposed between the plurality of provision areas and the passive light functional unit. The optical switch is an active component that requires an external power supply, and has a high failure rate and low reliability, but it is sufficient to accommodate some radio schemes among a plurality of radio schemes.

Specifically, the present disclosure is a base station system that connects each base station functional unit that provides each radio scheme and each antenna unit in each provision area via an optical fiber section, the base station system including a passive light functional unit disposed between each base station functional unit and each antenna unit and including each downlink signal output port to which the each downlink signal wavelength is allocated and each uplink signal output port to which each uplink signal wavelength is allocated, and an optical switch disposed between each of the antenna units and the passive light functional unit, houses some of the radio schemes, and switches to which one of the provision areas the some of the radio schemes are provided.

According to this configuration, in a case where subdivision of a provision area is expected, diversification of radio schemes is expected, and an increase in radio resources is expected, it is possible to suppress the number of ports of the optical switch functional unit and prevent waste of radio resources by arranging the passive light functional unit.

In addition, the present disclosure is a base station control device included in the base station system described above, the device including an optical switch switching request unit configured to request the optical switch to switch a provision area among the provision areas to which the some of the radio schemes are provided, an optical switch switching reception unit configured to be notified by the optical switch that switching has been made regarding to which one of the provision areas the some of the radio schemes are provided, and a signal wavelength setting request unit configured to request each of the antenna units in some of provision areas in which the some of the radio schemes are newly provided to set the each uplink signal wavelength via some base station functional units that provide the some of the radio schemes.

In addition, the present disclosure is a base station control method in the base station system described above, the method including an optical switch switching request step of requesting a base station control device to switch to which one of the provision areas the some of the radio schemes are provided, an optical switch switching step of causing the optical switch to switch to which one of the provision areas the some of the radio schemes are provided and notifying of the switching, an optical switch switching reception step of notifying that the base station control device has switched to which one of the provision areas the some of the radio schemes are provided, a signal wavelength setting request step of requesting, by the base station control device via some base station functional units that provide the some radio schemes, each of the antenna units in some provision areas to which the some radio schemes are newly provided to set the each uplink signal wavelength, a signal wavelength setting relay step in which the some base station functional units request the respective antenna units in the some provision areas to set the each uplink signal wavelength, a signal wavelength setting step in which the respective antenna units in the some of the provision areas set the each uplink signal wavelength and notify the some of the base station functional units of the setting, a signal wavelength setting notification step in which the some base station functional units notify the base station control device that the each uplink signal wavelength have been set in the some provision areas, and a signal wavelength setting reception step in which the base station control device is notified by the some base station functional units that the each uplink signal wavelength have been set in the some provision areas, in order.

In addition, the present disclosure is a base station control program in the base station system described above for causing a computer to sequentially execute an optical switch switching request step of requesting the optical switch to switch a provision area among the provision areas to which the some of the radio schemes are provided, an optical switch switching reception step of being notified by the optical switch that switching has been made regarding to which one of the provision areas the some of the radio schemes are provided, and a signal wavelength setting request step of requesting each of the antenna units in some of provision areas in which the some of the radio schemes are newly provided to set the each uplink signal wavelength via some base station functional units that provide the some of the radio schemes.

According to these configurations, it is possible to switch to which one of the plurality of provision areas some of the radio schemes accommodated by the optical switch functional unit is provided.

In addition, the present disclosure is a base station control device included in the base station system described above, the device including a signal wavelength switching request unit that requests each of the base station functional units to switch the each downlink signal wavelength, and requests each of the antenna units in the respective provision area via each of the base station functional units to switch the each uplink signal wavelength, and a signal wavelength switching reception unit that is notified of switching of the each downlink signal wavelength by each of the base station functional units and being notified of switching of the each uplink signal wavelength by each of the antenna units in each of the provision areas via each of the base station functional units, in which the optical switch switches which radio scheme among the respective radio schemes are accommodated.

In addition, the present disclosure is a base station control method in the base station system described above, the method including a signal wavelength switching request step in which the base station control device requests to switch the each downlink signal wavelength and requests to switch the each uplink signal wavelength, a downlink signal wavelength switching step in which each of the base station functional units switches the each downlink signal wavelength and requests to switch the each uplink signal wavelength, an uplink signal wavelength switching step in which each of the antenna units in each of the provision areas switches the each uplink signal wavelength and notifies the switching, a signal wavelength switching notification step of notifying that each of the base station functional units has switched the each downlink signal wavelength and notifying that the each uplink signal wavelength has been switched, and a signal wavelength switching reception step in which the base station control device is notified of switching of the each downlink signal wavelength and is notified of switching of the each uplink signal wavelength in order, in which the optical switch switches which radio scheme among the respective radio schemes are accommodated.

In addition, the present disclosure is a base station control program in the base station system described above for causing a computer to sequentially execute a signal wavelength switching request step of requesting each of the base station functional units to switch the each downlink signal wavelength, and requesting each of the antenna units in the respective provision area via each of the base station functional units to switch the each uplink signal wavelength, and a signal wavelength switching reception step of being notified of switching of the each downlink signal wavelength by each of the base station functional units and being notified of switching of each uplink signal wavelength by each of the antenna units in each of the provision areas via each of the base station functional units, in which the optical switch switches which radio scheme among the respective radio schemes are accommodated.

According to these configurations, the optical switch functional unit that accommodates some of radio schemes can switch which radio scheme among a plurality of radio schemes are accommodated.

Advantageous Effects of Invention

As described above, the present disclosure can prevent an increase in the number of ports of an optical switch functional unit and can prevent waste of radio resources in a case where subdivision of a provision area is expected, diversification of radio schemes is expected, and an increase in radio resources is expected.

BRIEF DESCRIPTION OF DRAWINGS

FIG. 1 is a diagram illustrating a configuration of a conventional general base station system.

FIG. 2 is a diagram illustrating a configuration of a base station system of Non Patent Literature 1.

Figure 4:
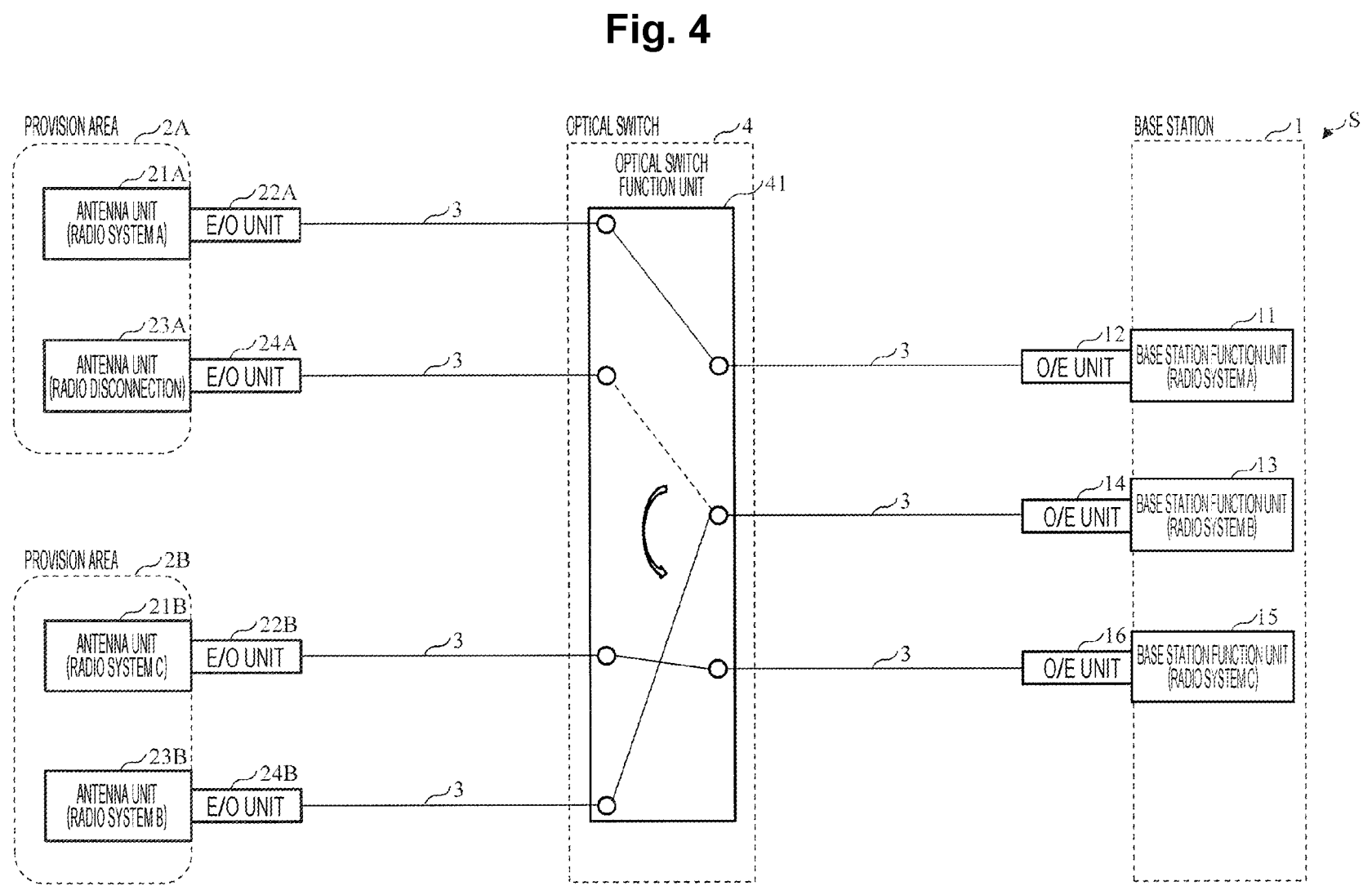

FIG. 4 is a diagram illustrating a configuration of the base station system of the solution to the problem.

FIG. 7 is a diagram illustrating a configuration of a passive light functional unit of the present disclosure.

FIG. 12 is a diagram illustrating the signal wavelength switching processing after the optical switch switching processing of the present disclosure.

FIG. 13 is a view illustrating optical switch switching processing after the signal wavelength switching processing of the present disclosure.

DESCRIPTION OF EMBODIMENTS

An embodiment of the present disclosure will be described with reference to the accompanying drawings. The embodiments to be described below are examples carried out in the present disclosure, and the present disclosure is not limited to the following embodiments.

(Base Station System of Present Disclosure)

Figure 3:
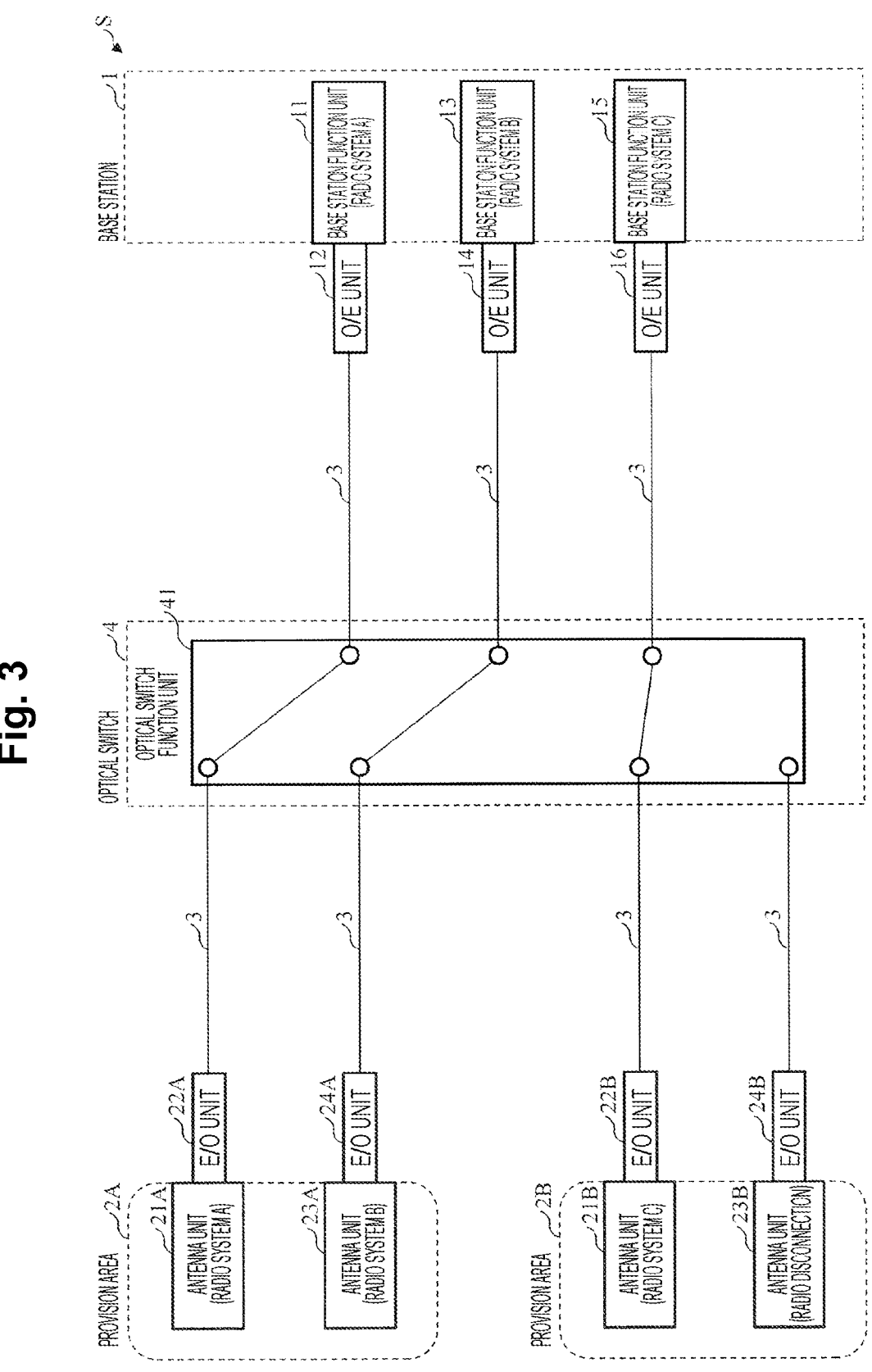
FIG. 3 is a diagram illustrating a configuration of a base station system of the solution to the problem.
Figure 5:
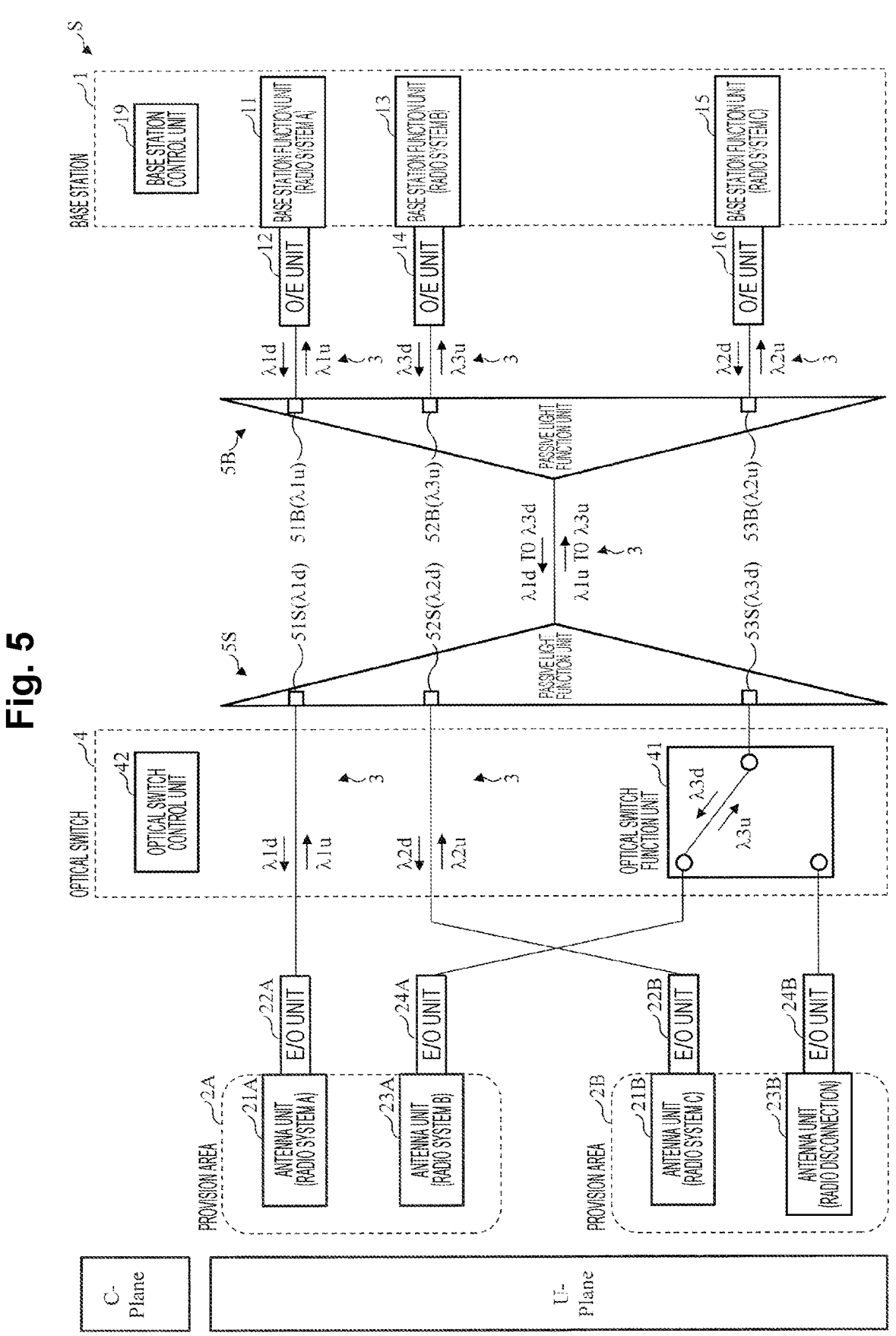
FIG. 5 is a diagram illustrating a configuration of the base station system of the present disclosure.

FIG. 5 illustrates a configuration of a base station system of the present disclosure. A base station system S includes base station functional units 11, 13, and 15 and O/E units 12, 14, and 16 on a base station 1 side, antenna units 21A and 23A and E/O units 22A and 24A on a provision area 2A side, antenna units 21B and 23B and E/O units 22B and 24B on a provision area 2B side, an optical fiber section 3 that connects the base station 1 side and the sides of the provision areas 2A and 2B, an improved optical switch 4, and new passive light functional units 5B and 5S. The base station 1 newly includes a base station control unit 19.

Figure 6:
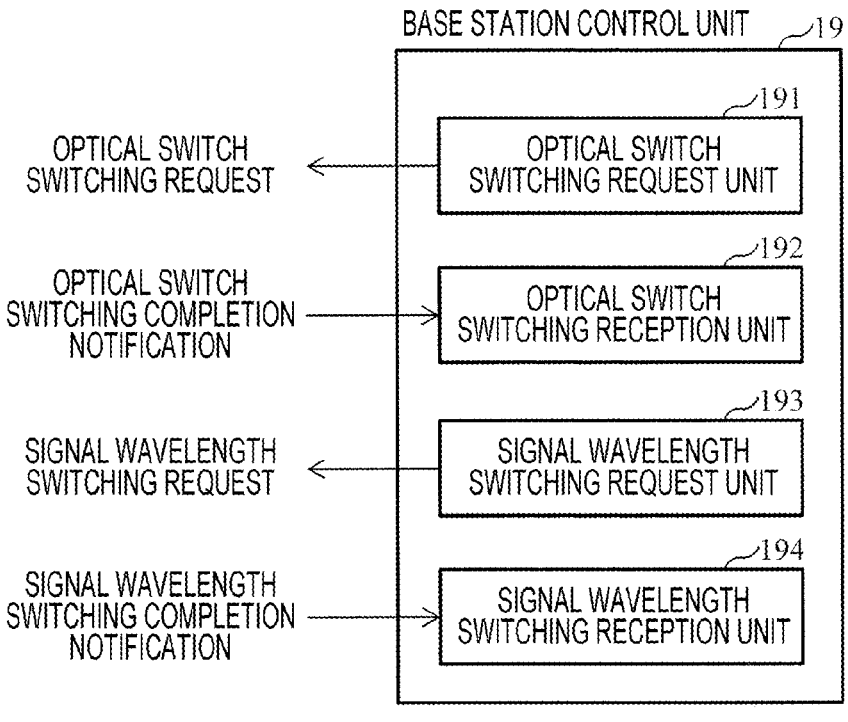
FIG. 6 is a diagram illustrating a configuration of a base station control unit of the present disclosure.
Figure 9:
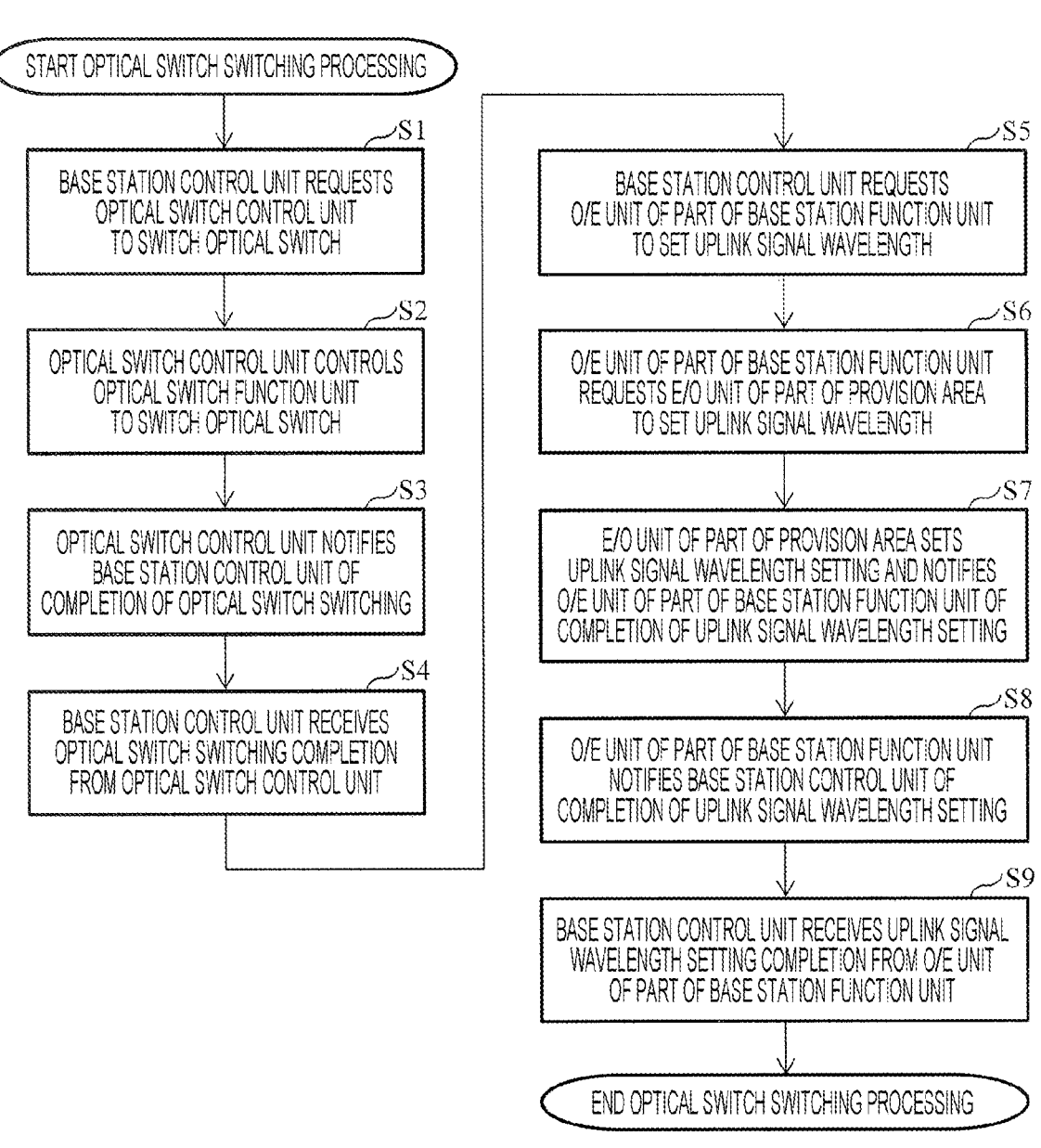
FIG. 9 is a diagram illustrating a flow of optical switch switching processing of the present disclosure.
Figure 11:
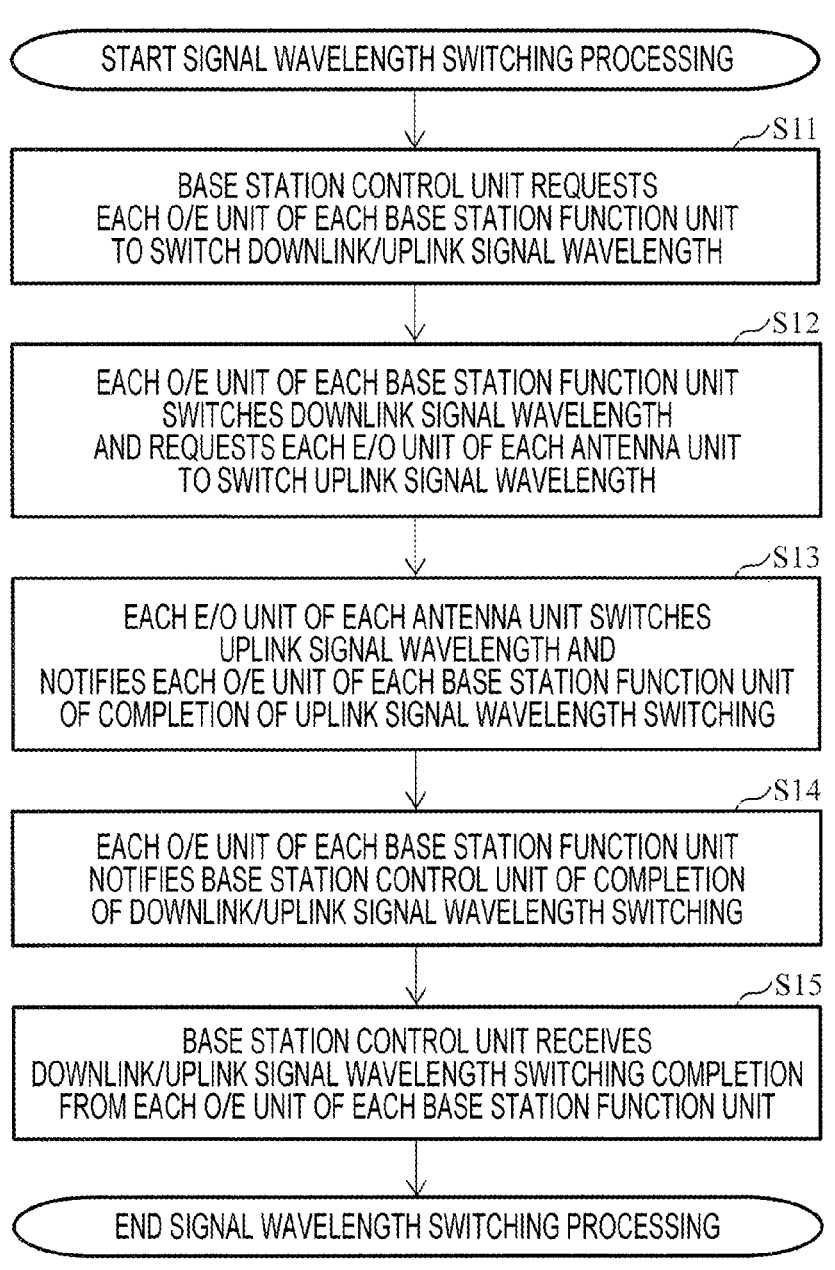
FIG. 11 is a diagram illustrating a flow of signal wavelength switching processing of the present disclosure.

FIG. 6 illustrates a configuration of a base station control unit of the present disclosure. The base station control unit 19 includes an optical switch switching request unit 191, an optical switch switching reception unit 192, a signal wavelength switching request unit 193, and a signal wavelength switching reception unit 194, and the base station control program illustrated in FIGS. 9 and 11 is installed.

The passive light functional units 5S and 5B are disposed between the base station functional units 11, 13, and 15 and the provision areas 2A and 2B, and include input/output ports 51S, 52S, and 53S to which outputs of the downlink signal wavelengths λ1d, λ2d, and λ3d are allocated, and input/output ports 51B, 52B, and 53B to which outputs of the uplink signal wavelengths λ1u, λ3u, and λ2u are allocated, respectively.

Figure 7:
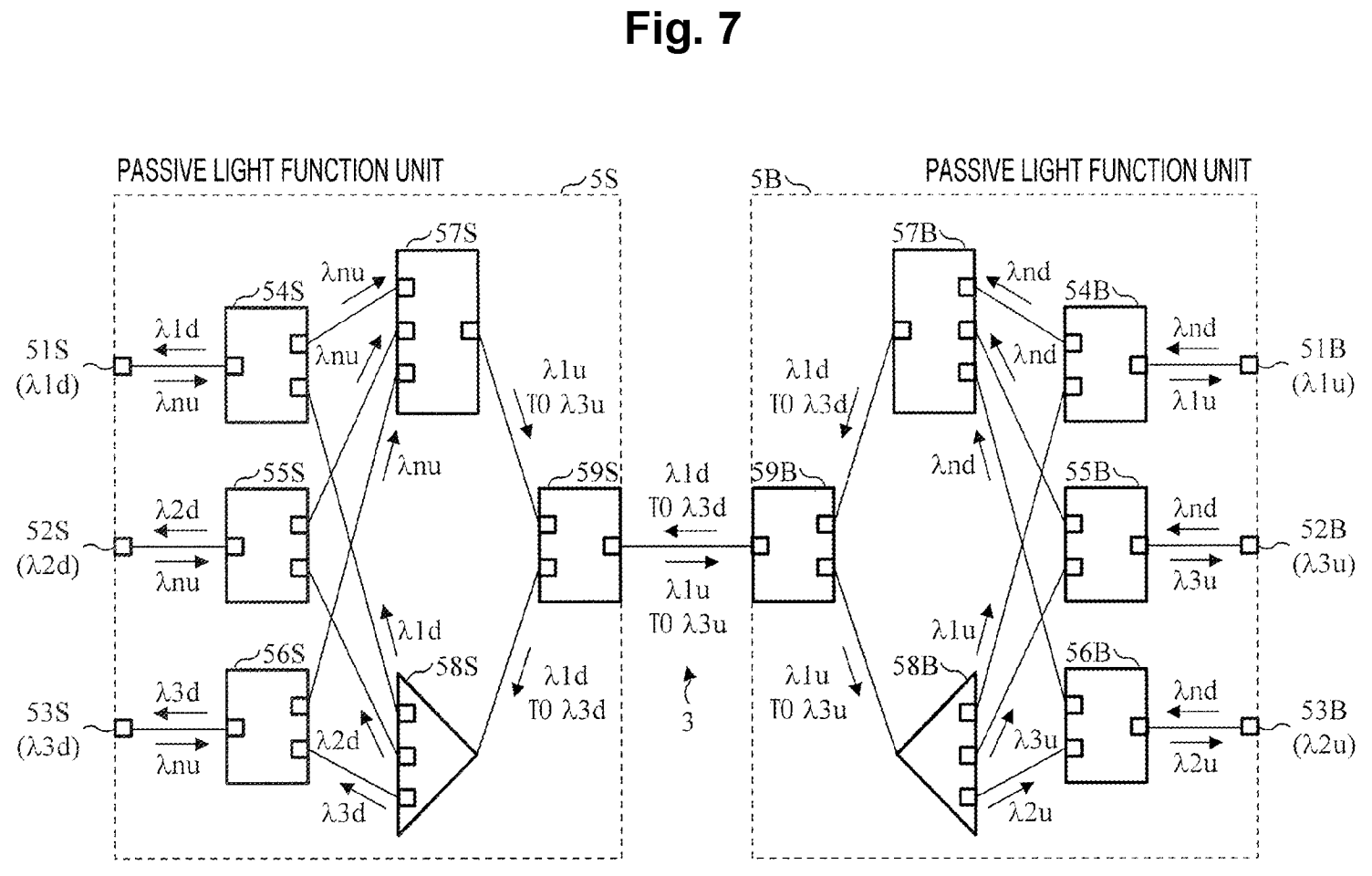

FIG. 7 illustrates a configuration of the passive light functional unit of the present disclosure. The wavelength filter units 54S, 55S, 56S, 59S, 54B, 55B, 56B, and 59B separate a signal having an uplink wavelength and a signal having a downlink wavelength. The optical splitter units 57S and 57B multiplex and output input signals having different wavelengths. The array waveguide diffraction gratings 58S and 58B separate and output input signals having a plurality of wavelengths. Both are passive components that do not require an external power source.

First, a signal having a downlink wavelength will be described. The wavelength filter units 54B, 55B, and 56B receives and output an arbitrary downlink wavelength λnd (n=1 to 3). The optical splitter unit 57B receives and multiplexes an arbitrary downlink wavelength λnd (n=1 to 3). The wavelength filter unit 59B receives and outputs downlink wavelengths λ1d to λ3d. The wavelength filter unit 59S receives and outputs downlink wavelengths λ1d to λ3d. The array waveguide diffraction grating 58S inputs and demultiplexes the downlink wavelengths λ1d to λ3d. The wavelength filter units 54S, 55S, and 56S receive and output the downlink wavelengths λ1d, λ2d, and λ3d, respectively. In this manner, the outputs of the downlink wavelengths λ1d, λ2d, and λ3d are allocated to the input/output ports 51S, 52S, and 53S, respectively.

Next, a signal having an uplink wavelength will be described. The wavelength filter units 54S, 55S, and 56S receives and output an arbitrary uplink wavelength λnu (n=1 to 3). The optical splitter unit 57S receives and multiplexes an arbitrary uplink wavelength λnu (n=1 to 3). The wavelength filter unit 59S receives and outputs uplink wavelengths λ1u to λ3u. The wavelength filter unit 59B receives and outputs uplink wavelengths λ1u to λ3u. The arrayed waveguide diffraction grating 58B inputs and demultiplexes the upstream wavelengths λ1u to λ3u. The wavelength filter units 54B, 55B, and 56B receive and output uplink wavelengths λ1u, λ3u, and λ2u, respectively. In this manner, the outputs of the uplink wavelengths λ1u, λ3u, and λ2u are allocated to the input/output ports 51B, 52B, and 53B, respectively.

The optical switch 4 is disposed between the provision areas 2A and 2B and the passive light functional units 5S and 5B, accommodates some of the radio schemes A, B, and C, and switches which one of the provision areas 2A and 2B is provided with some of the radio schemes.

In FIG. 5, as an initial, state the provision area 2A is provided with the radio schemes A and B, and the provision area 2B is provided with the radio scheme C. Specifically, the following processing is executed in a user (U)-plane which is a layer for exchanging user data.

The base station functional unit 11 provides the radio scheme A, and the antenna unit 21A applies the radio scheme A. Here, the O/E unit 12 performs optical conversion and transmission for the downlink signal having the wavelength λ1d, the passive light functional unit 5B performs reception and multiplexing at the input/output port 51B, the passive light functional unit 5S performs output at the demultiplexing/input/output port 51S, and the E/O unit 22A performs electrical conversion and reception without passing through the optical switch functional unit 41. On the other hand, regarding the uplink signal having the wavelength λ1u, the E/O unit 22A performs optical conversion and transmission, the passive light functional unit 5S performs reception and multiplexing at the input/output port 51S without passing through the optical switch functional unit 41, the passive light functional unit 5B performs output at the demultiplexing/input/output port 51B, and the O/E unit 12 performs electrical conversion and reception.

The base station functional unit 13 provides the radio scheme B, and the antenna unit 23A applies the radio scheme B. Here, the optical switch functional unit 41 accommodates the radio scheme B and is switched to the provision area 2A side. Then, the O/E unit 14 performs optical conversion and transmission for the downlink signal having the wavelength λ3d, the passive light functional unit 5B performs reception and multiplexing at the input/output port 52B, the passive light functional unit 5S performs output at the demultiplexing/input/output port 53S, and the E/O unit 24A performs electrical conversion and reception via the optical switch functional unit 41. On the other hand, regarding the uplink signal having the wavelength λ3u, the E/O unit 24A performs optical conversion and transmission, the passive light functional unit 5S performs reception and multiplexing at the input/output port 53S via the optical switch functional unit 41, the passive light functional unit 5B performs output at the demultiplexing/input/output port 52B, and the O/E unit 14 performs electrical conversion and reception.

The base station functional unit 15 provides the radio scheme C, and the antenna unit 21B applies the radio scheme C. Here, the O/E unit 16 performs optical conversion and transmission for the downlink signal having the wavelength λ2d, the passive light functional unit 5B performs reception and multiplexing at the input/output port 53B, the passive light functional unit 5S performs output at the demultiplexing/input/output port 52S, and the E/O unit 22B performs electrical conversion and reception without passing through the optical switch functional unit 41. On the other hand, regarding the uplink signal having the wavelength λ2u, the E/O unit 22B performs optical conversion and transmission, the passive light functional unit 5S performs reception and multiplexing at the input/output port 52S without passing through the optical switch functional unit 41, the passive light functional unit 5B performs output at the demultiplexing/input/output port 53B, and the O/E unit 16 performs electrical conversion and reception.

As described above, in a case where subdivision of a provision area is expected, diversification of a radio scheme is expected, and an increase in radio resources is expected, it is possible to suppress the number of ports of the optical switch functional unit and prevent waste of radio resources by arranging the passive light functional unit.

(Optical Switch Switching Processing of Present Disclosure)

Figure 8:
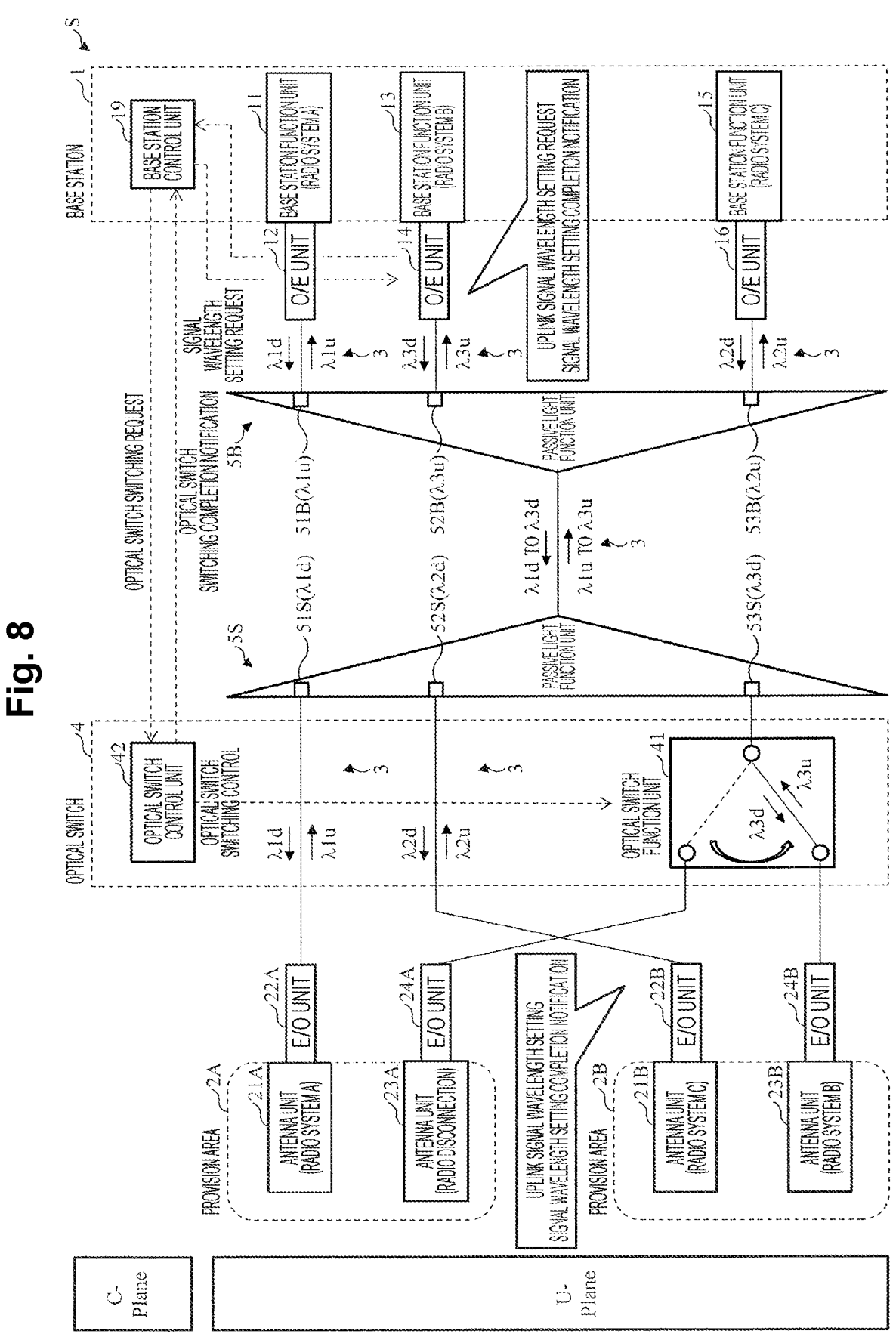
FIG. 8 is a diagram illustrating a specific example of optical switch switching processing of the present disclosure.

FIG. 8 illustrates a specific example of optical switch switching processing of the present disclosure. FIG. 9 illustrates a flow of the optical switch switching processing according to the present disclosure. In FIG. 8, after the optical switch is switched from the initial state, the provision area 2A is provided with the radio scheme A, and the provision area 2B is provided with the radio schemes B and C. Specifically, the following processing is executed in a user (U)-plane and a control (C)-plane which are layers for exchanging user data and control information, respectively.

First, optical switch switching will be described. The optical switch switching request unit 191 requests the optical switch control unit 42 to switch so that the radio scheme B is provided to the provision area 2B out of the provision areas 2A and 2B (step S1). The optical switch control unit 42 controls the optical switch functional unit 41 to switch so that the radio scheme B is provided to the provision area 2B of the provision areas 2A and 2B (step S2). The optical switch control unit 42 notifies the optical switch switching reception unit 192 that the radio scheme B has been switched to be provided in the provision area 2B among the provision areas 2A and 2B (step S3). The optical switch switching reception unit 192 receives, from the optical switch control unit 42, the fact that the radio scheme B has been switched to be provided to the provision area 2B among the provision areas 2A and 2B (step S4).

Next, uplink signal wavelength setting will be described. The signal wavelength switching request unit 193 requests the E/O unit 24B of the antenna unit 23B to set the uplink signal wavelength to λ3u via the O/E unit 14 of the base station functional unit 13 (step S5). The O/E unit 14 of the base station functional unit 13 requests the E/O unit 24B of the antenna unit 23B to set the uplink signal wavelength to λ3u (step S6). The E/O unit 24B of the antenna unit 23B sets the uplink signal wavelength to λ3u, and notifies the O/E unit 14 of the base station functional unit 13 that the uplink signal wavelength is set to λ3u (step S7). The O/E unit 14 of the base station functional unit 13 notifies the signal wavelength switching reception unit 194 that the uplink signal wavelength is set to λ3u (step S8). The signal wavelength switching reception unit 194 receives information indicating that the uplink signal wavelength is set to λ3u from the O/E unit 14 of the base station functional unit 13 (step S9). After completion of steps S1 to S9, the user communication is resumed. Changes from the initial state to after switching the optical switch and after setting the uplink signal wavelength will be described.

The base station functional unit 13 provides the radio scheme B, and the antenna unit 23B applies the radio scheme B. Here, the optical switch functional unit 41 accommodates the radio scheme B and is switched to the provision area 2B side. Then, the O/E unit 14 performs optical conversion and transmission for the downlink signal having the wavelength λ3d, the passive light functional unit 5B performs reception and multiplexing at the input/output port 52B, the passive light functional unit 5S performs output at the demultiplexing/input/output port 53S, and the E/O unit 24B performs electrical conversion and reception via the optical switch functional unit 41. On the other hand, regarding the uplink signal having the wavelength λ3u, the E/O unit 24B performs optical conversion and transmission, the passive light functional unit 5S performs reception and multiplexing at the input/output port 53S via the optical switch functional unit 41, the passive light functional unit 5B performs output at the demultiplexing/input/output port 52B, and the O/E unit 14 performs electrical conversion and reception.

As described above, it is possible to switch to which one of the plurality of provision areas some of the radio schemes accommodated by the optical switch functional unit is provided.

(Signal Wavelength Switching Processing of Present Disclosure)

Figure 10:
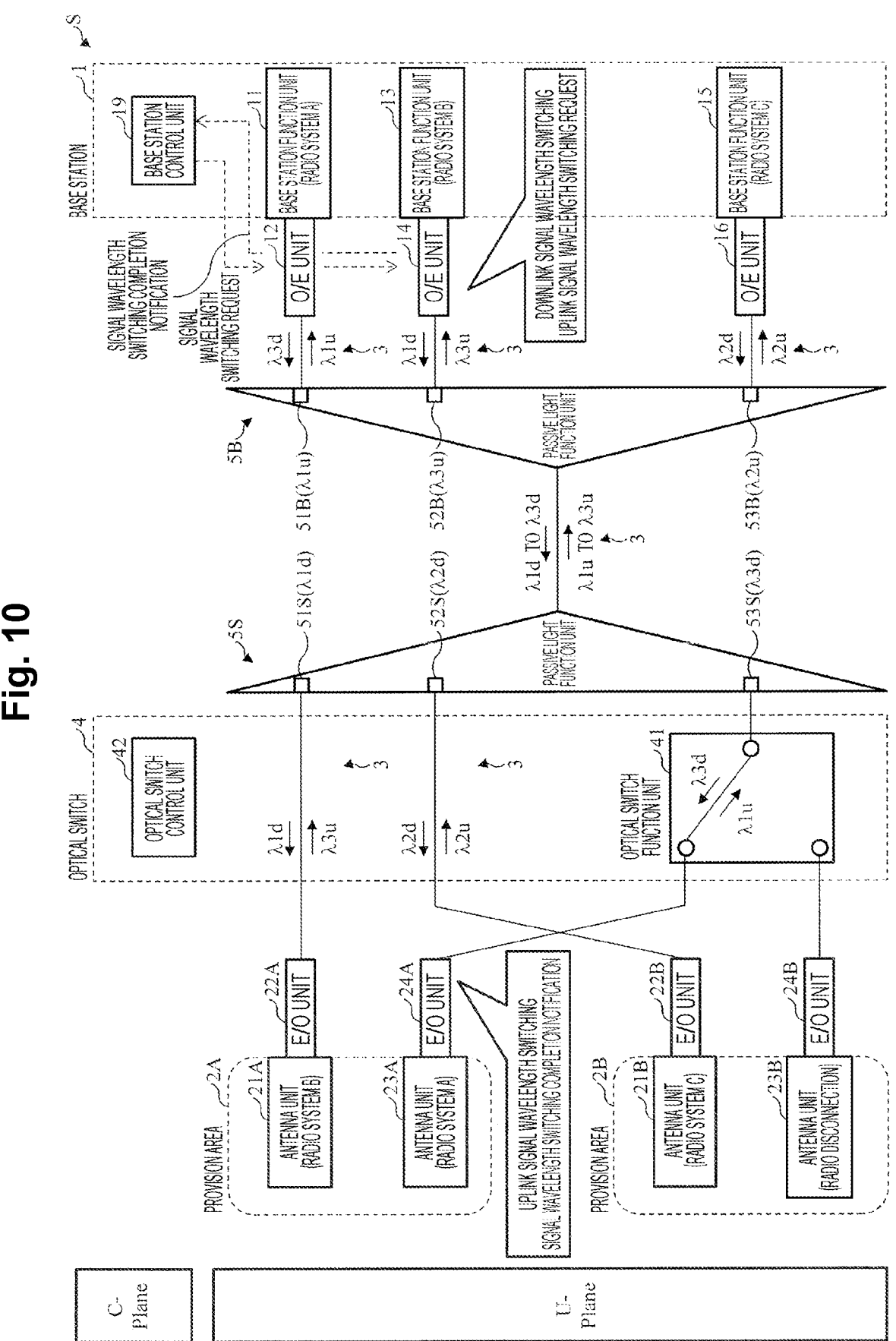
FIG. 10 is a diagram illustrating a specific example of signal wavelength switching processing of the present disclosure.

A specific example of the signal wavelength switching processing of the present disclosure is illustrated in FIG. 10. FIG. 11 illustrates a flow of the signal wavelength switching processing of the present disclosure. In FIG. 10, after the signal wavelength is switched from the initial state, the provision area 2A is provided with the radio schemes A and B, and the provision area 2B is provided with the radio scheme C. Specifically, the following processing is executed in a user (U)-plane and a control (C)-plane which are layers for exchanging user data and control information, respectively.

The signal wavelength switching request unit 193 requests the O/E unit 12 of the base station functional unit 11 to switch the downlink signal wavelength to λ3d, and requests the E/O unit 24A of the antenna unit 23A to switch the uplink signal wavelength to λ1u via the O/E unit 12 of the base station functional unit 11. Then, the signal wavelength switching request unit 193 requests the O/E unit 14 of the base station functional unit 13 to switch the downlink signal wavelength to λ1d, and request the E/O unit 22A of the antenna unit 21A to switch the uplink signal wavelength to λ3u via the O/E unit 14 of the base station functional unit 13 (step S11).

The O/E unit 12 of the base station functional unit 11 switches the downlink signal wavelength to λ3d, and requests the E/O unit 24A of the antenna unit 23A to switch the uplink signal wavelength to λ1u using the switched downlink signal wavelength λ3d via the optical switch functional unit 41. The O/E unit 14 of the base station functional unit 13 switches the downlink signal wavelength to λ1d, and requests the E/O unit 22A of the antenna unit 21A to switch the uplink signal wavelength to λ3u using the switched downlink signal wavelength λ1d without passing through the optical switch functional unit 41 (step S12).

The E/O unit 24A of the antenna unit 23A switches the uplink signal wavelength to λ1u, and notifies the O/E unit 12 of the base station functional unit 11 that the uplink signal wavelength has been switched to λ1u via the optical switch functional unit 41 by using the switched uplink signal wavelength λ1u. The E/O unit 22A of the antenna unit 21A switches the uplink signal wavelength to λ3u, and notifies the O/E unit 14 of the base station functional unit 13 that the uplink signal wavelength has been switched to λ3u using the switched uplink signal wavelength λ3u without passing through the optical switch functional unit 41 (step S13).

The O/E unit 12 of the base station functional unit 11 notifies the signal wavelength switching reception unit 194 that the downlink signal wavelength has been switched to λ3d, and notifies the E/O unit 24A of the antenna unit 23A that the uplink signal wavelength has been switched to λ1u. The O/E unit 14 of the base station functional unit 13 notifies the signal wavelength switching reception unit 194 that the downlink signal wavelength has been switched to λ1d, and notifies the E/O unit 22A of the antenna unit 21A that the uplink signal wavelength has been switched to λ3u (step S14).

The signal wavelength switching reception unit 194 receives the effect that the downlink signal wavelength has been switched to λ3d from the O/E unit 12 of the base station
functional unit 11, and receives the effect that the E/O unit
24A of the antenna unit 23A has switched the uplink signal
wavelength to λ1u. Then, the information indicating that the
downlink signal wavelength has been switched to λ1d is
received from the O/E unit 14 of the base station functional
unit 13, and the information indicating that the E/O unit 22A
of the antenna unit 21A has switched the uplink signal
wavelength to λ3u is received (step S15). After completion
of steps S11 to S15, the user communication is resumed. A
change from the initial state to after the signal wavelength
switching will be described.

The base station functional unit 11 provides the radio
scheme A, and the antenna unit 23A applies the radio
scheme A. Here, the O/E unit 12 performs optical conver-
sion and transmission for the downlink signal having the
wavelength λ3d, the passive light functional unit 5B per-
forms reception and multiplexing at the input/output port
51B, the passive light functional unit 5S performs output at
the demultiplexing/input/output port 53S, and the E/O unit
24A performs electrical conversion and reception via the
optical switch functional unit 41. On the other hand, regard-
ing the uplink signal having the wavelength λ1u, the E/O
unit 24A performs optical conversion and transmission, the
passive light functional unit 5S performs reception and
multiplexing at the input/output port 53S via the optical
switch functional unit 41, the passive light functional unit
5B performs output at the demultiplexing/input/output port
51B, and the O/E unit 12 performs electrical conversion and
reception.

The base station functional unit 13 provides the radio
scheme B, and the antenna unit 21A applies the radio
scheme B. Here, the O/E unit 14 performs optical conver-
sion and transmission for the downlink signal having the
wavelength λ1d, the passive light functional unit 5B per-
forms reception and multiplexing at the input/output port
52B, the passive light functional unit 5S performs output at
the demultiplexing/input/output port 51S, and the E/O unit
22A performs electrical conversion and reception without
passing through the optical switch functional unit 41. On the
other hand, regarding the uplink signal having the wave-
length λ3u, the E/O unit 22A performs optical conversion
and transmission, the passive light functional unit 5S per-
forms input and multiplexing at the input/output port 51S
without passing through the optical switch functional unit
41, the passive light functional unit 5B performs output at
the demultiplexing/input/output port 52B, and the O/E unit
14 performs electrical conversion and reception.

As described above, the optical switch functional unit that
accommodates some of radio schemes can switch which
radio scheme among a plurality of radio schemes are accom-
modated.
(Combination of Both Switching Processing Procedures of
Present Disclosure)

Figure 12:
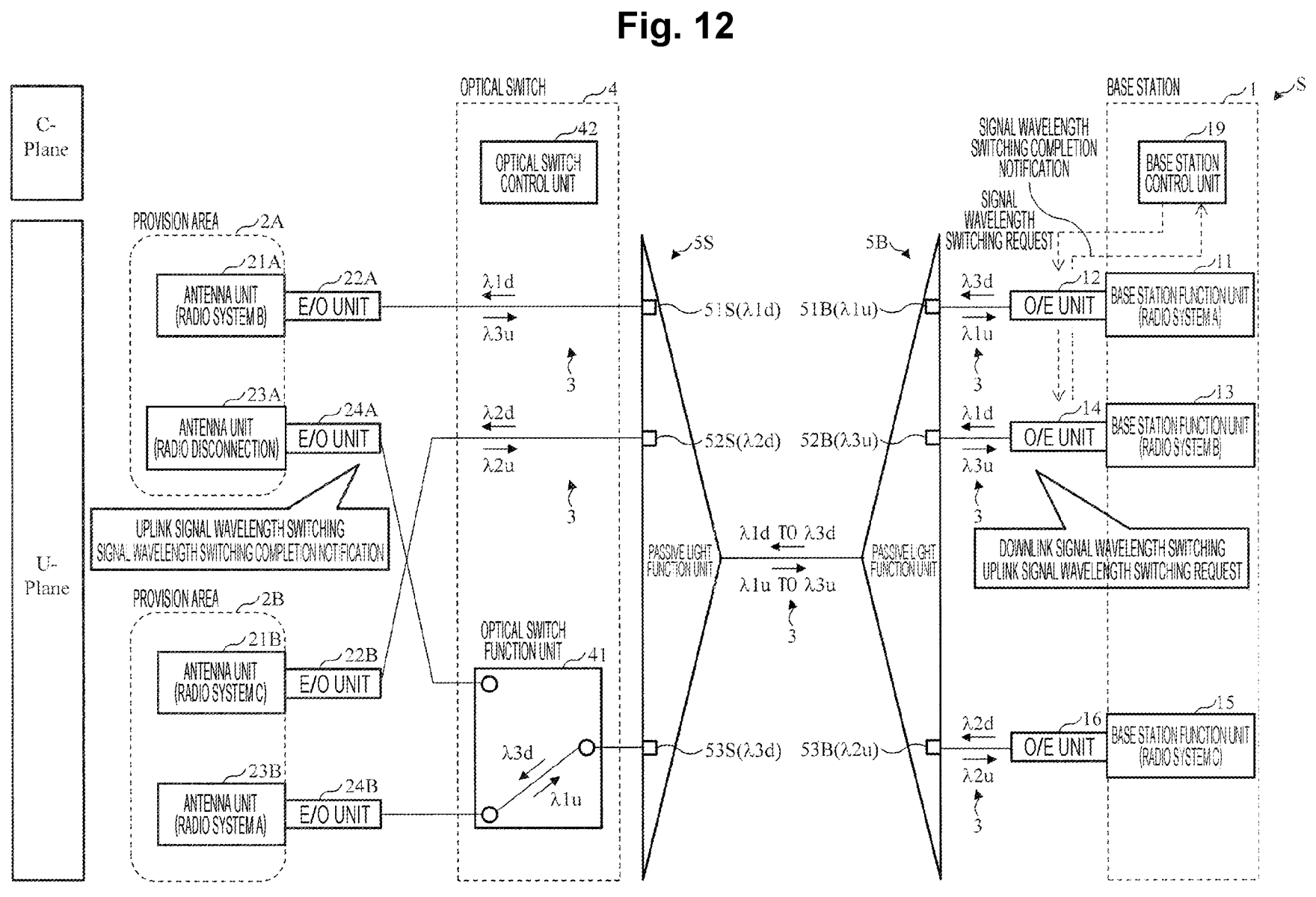

FIG. 12 illustrates the signal wavelength switching pro-
cessing after the optical switch switching processing of the
present disclosure. In FIG. 12, after switching the signal
wavelength after switching the optical switch, the provision
area 2A is provided with the radio scheme B, and the
provision area 2B is provided with the radio schemes A and
C. Specifically, processing similar to the processing of FIG.
10 is executed. However, processing different from the
processing of FIG. 10 is executed in that the base station
functional unit 11 provides the antenna unit 23B with the
radio scheme A. Then, the signal wavelength switching
result after the optical switch switching processing is similar to the optical switch switching result after the signal wave-
length switching processing (see FIG. 13).

Figure 13:
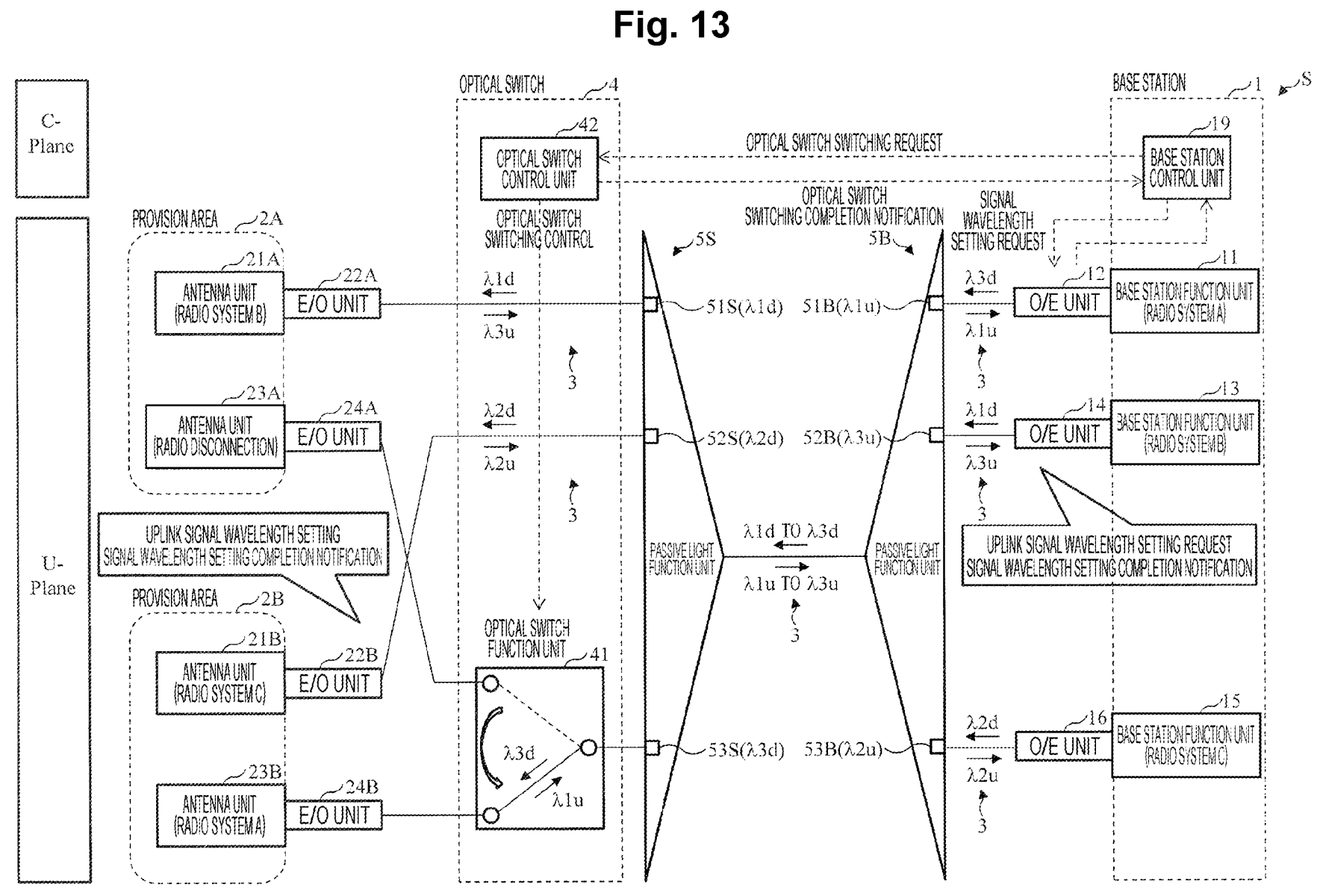

FIG. 13 illustrates the optical switch switching processing
after the signal wavelength switching processing of the
present disclosure. In FIG. 13, after the signal wavelength
switching processing and after the optical switching pro-
cessing, the provision area 2A is provided with the radio
scheme B, and the provision area 2B is provided with the
radio schemes A and C. Specifically, processing similar to
the processing of FIG. 8 is executed. However, processing
different from the processing of FIG. 8 is executed in that the
optical switch functional unit 41 accommodates the radio
scheme A. Then, the optical switch switching result after the
signal wavelength switching processing is similar to the
signal wavelength switching result after the optical switch
switching processing (see FIG. 12).

In the present embodiment, the optical switch functional
unit 41 accommodates the radio schemes A and B. As a
modification example, the optical switch functional unit 41
may accommodate the radio scheme C. In the present
embodiment, the base station functional unit 15 provides the
antenna unit 21B with the radio scheme C. As a modification
example, the base station functional unit 15 may provide the
radio scheme C to the antenna units 21A, 23A, and 23B.

In the present embodiment, the base station system S
provides three radio schemes, and has two provision areas.
As a modification example, the base station system S may
provide four or more radio schemes, and may have three or
more provision areas. In the present embodiment, the optical
switch functional unit 41 has one port on the base station 1
side and two ports on the provision area side. As a modifi-
cation example, the optical switch functional unit 41 may
have at least one port on the base station 1 side, and may
have at least two ports on the provision area side.

INDUSTRIAL APPLICABILITY

The base station system, the base station control device,
the base station control method, and the base station control
program of the present disclosure can prevent an increase in
the number of ports of an optical switch functional unit and
can prevent waste of radio resources when subdivision of a
provision area is expected, diversification of a radio scheme
is expected, and an increase in radio resources is expected.

REFERENCE SIGNS LIST

S Base station system
1 Base station
2, 2A, 2B Provision area
3 Optical fiber section
4 Optical switch
5B, 5S Passive light functional unit
11, 13, 15, 17 Base station functional unit
12, 14, 16, 18 O/E unit
19 Base station control unit
21, 21A, 23A, 21B, 23B Antenna unit
22, 22A, 24A, 22B, 24B E/O unit
41 Optical switch functional unit
42 Optical switch control unit
51B, 52B, 53B, 51S, 52S, 53S Input/output port
54B, 55B, 56B, 59B, 54S, 55S, 56S, 59S Wavelength
  filter unit
57B, 57S Optical splitter unit
58B, 58S Array waveguide diffraction grating
191 Optical switch switching request unit
192 Optical switch switching reception unit 193 Signal wavelength switching request unit
194 Signal wavelength switching reception unit

The invention claimed is:

1. A base station system configured to connect a plurality of base station functional units and a plurality of antenna units disposed in a plurality of provision areas via an optical fiber section, wherein the plurality of base station functional units are configured to provide a plurality of radio schemes, the base station system comprising:

a plurality of passive light functional units disposed between the plurality of base station functional units and the plurality of antenna units, wherein a first passive light functional unit among the plurality of passive light functional units includes a plurality of downlink signal output ports to which a plurality of downlink signal wavelengths are allocated and a plurality of uplink signal output ports to which plurality of uplink signal wavelengths are allocated; and an optical switch disposed between the plurality of antenna units and the plurality of passive light functional units, configured to accommodate a particular radio scheme among the plurality of radio schemes, and switch to a particular provision area among the plurality of provision areas where the particular radio scheme is provided.

2. The base station system of claim 1, comprising a base station control device, the base station control device comprising:

an optical switch switching request unit configured to request the optical switch to switch to the particular provision area among the plurality of provision areas where the particular radio schemes is provided;

an optical switch switching reception unit, configured to be notified by the optical switch that switching has been made to the particular provision area where the particular radio scheme is provided; and a signal wavelength setting request unit configured to request an antenna unit in the particular provision area where the particular radio scheme is newly provided to set an uplink signal wavelength via a base station functional unit that provides the particular radio scheme.

3. The base station system of claim 2, the base station control device further comprising:

a signal wavelength switching request unit configured to request the base station functional unit to switch a downlink signal wavelength, and request the antenna unit in the particular provision area to switch the uplink signal wavelength; and a signal wavelength switching reception unit configured to be notified of switching of the downlink signal wavelength by the base station functional unit and be notified of switching of the uplink signal wavelength by the antenna unit in the particular provision area, wherein the optical switch is configured to switch the particular radio scheme among the plurality of radio schemes.

4. A base station control method performed in a base station system, the method comprising:

requesting a base station control device to switch to a particular provision area where a particular radio scheme is provided;

causing an optical switch to switch to the particular provision area where the particular radio scheme is provided and notifying of the switching;

notifying that the base station control device has switched to the particular provision area where the particular radio scheme is provided;

requesting, by the base station control device via a base station functional unit that provides the particular radio schemes, an antenna unit in the particular provision area where the particular radio scheme is newly provided to set an uplink signal wavelength;

requesting, by the base station functional unit, the antenna unit in the particular provision area to set the uplink signal wavelength;

setting, by the antenna unit in the particular provision area, the uplink signal wavelength and notifying the base station functional unit of the setting;

notifying, by the base station functional unit, the base station control device that the uplink signal wavelength has been set in the particular provision area.

5. The base station control method of claim 4, further comprising:

requesting, by the base station control device, to switch a downlink signal wavelength and requesting to switch the uplink signal wavelength;

switching, by the base station functional unit, the downlink signal wavelength and requesting to switch the uplink signal wavelength;

switching, by the antenna unit in the particular provision area, the uplink signal wavelength and notifying the switching;

notifying that the base station functional unit has switched the downlink signal wavelength and notifying that the uplink signal wavelength has been switched; and being notified of, by the base station control device, switching of the downlink signal wavelength and being notified of switching of the uplink signal wavelength in order, wherein switching, by the optical switch, to the particular radio scheme.

6. A non-transitory computer readable medium storing a program in a base station system, wherein execution of the program causes a computer to sequentially execute:

requesting an optical switch to switch to a particular provision area among a plurality of provision areas where a particular radio scheme among a plurality of radio schemes is provided;

being notified by the optical switch that switching has been made to the particular provision area where the particular radio scheme is provided; and requesting an antenna unit in the particular provision area where the particular radio scheme is newly provided to set an uplink signal wavelength via a base station functional unit that provides the particular radio scheme.

7. The non-transitory computer readable medium according to claim 6, wherein execution of the program causes the computer to further execute:

requesting the base station functional unit to switch a downlink signal wavelength, and requesting the antenna unit in the particular provision area to switch the uplink signal wavelength; and being notified of switching of the downlink signal wavelength by the base station functional unit and being notified of switching of the uplink signal wavelength by the antenna unit in the particular provision area, wherein switching, by the optical switch, to the particular radio
scheme among the plurality of radio schemes.

* * * * *